United States Patent [19]

Suga et al.

[11] 4,350,234
[45] Sep. 21, 1982

[54] AUTOMATIC TRANSMISSION SYSTEM PROVIDED WITH A FUNCTION OF ENGINE BRAKE

[75] Inventors: Masaaki Suga, Yokohama; Hideo Hamada, Yokosuka, both of Japan

[73] Assignee: Nissan Motor Co., Ltd., Yokohama, Japan

[21] Appl. No.: 116,849

[22] Filed: Jan. 30, 1980

[30] Foreign Application Priority Data

Feb. 2, 1979 [JP] Japan .................................. 54-11132
Sep. 7, 1979 [JP] Japan ................................ 54-114075
Sep. 21, 1979 [JP] Japan ............................... 54-120874

[51] Int. Cl.³ .......................................... B60K 41/20
[52] U.S. Cl. ................................ 192/4 A; 192/0.055; 192/0.094; 192/9; 192/1; 74/866
[58] Field of Search ................... 192/0.055, 0.094, 1, 192/3 TR, 4 A, 4 C, 9; 74/866, 877, 865, 861, 843

[56] References Cited

U.S. PATENT DOCUMENTS

| | | | |
|---|---|---|---|
| 3,543,891 | 12/1970 | Mathers | 192/0.094 |
| 3,684,066 | 8/1972 | Kubo et al. | 192/4 A |
| 3,726,157 | 4/1973 | Marumo | 74/866 X |
| 3,776,048 | 12/1973 | Enomoto et al. | 74/866 |
| 3,881,368 | 5/1975 | Furuhashi et al. | 74/866 |
| 3,974,720 | 8/1976 | Iijima | 74/866 |
| 4,039,061 | 8/1977 | Pruvot et al. | 192/4 A |
| 4,103,764 | 8/1978 | Iijima | 192/4 A |
| 4,262,783 | 4/1981 | Scarrott et al. | 192/4 A X |

Primary Examiner—George H. Krizmanich
Attorney, Agent, or Firm—Lane, Aitken, Kice & Kananen

[57] ABSTRACT

An electronically or hydraulically controlled automatic transmission system comprises three means for detecting the release of an accelerator pedal, for detecting the depression of a brake pedal and for detecting an excess of acceleration over a predetermined amount, and only in response to the simultaneous detections in all of those means, which are caused in running down a slope, an automatic engine braking can be effected by the electronically controlled down-shift of the speed range of the vehicle, and further on account of an appropriate delay of the detection of the released accelerator pedal, an unnecessary engine braking can be prevented in the ordinary running which is accompanied by frequent slight variations in acceleration on a flat road or a gradual up or down slope.

7 Claims, 10 Drawing Figures

AUTOMATIC TRANSMISSION SYSTEM PROVIDED WITH A FUNCTION OF ENGINE BRAKE

BACKGROUND OF THE INVENTION

(1) Field of the Invention

The present invention relates to an automatic transmission system provided with a function of engine braking, particularly to an improvement thereof, in which the ranges of the vehicle speed can be changed from one to another under an electronic control or an hydraulic control.

(2) Description of the Prior Art

In a hydraulically controlled conventional automatic transmission system, when a manual valve thereof is maintained in a range of automatic speed change, that is, in a "D"-range in the case of down slope running, an engine braking function can hardly be expected. Thus, particularly in the case of steep and long down slope running, it is required each time for a driver to operate the manual valve manually from the D-range to a second fixed speed range or to a first fixed speed range, in order to effect the engine braking without the frequent necessity of operating the foot brake.

Regarding the above, the matter is the same in a conventional electronically controlled automatic transmission system. For the purpose of preventing the above troublesome matter, an electronically controlled or hydraulically controlled automatic transmission system has been developed such that, when an accelerator pedal is released and a brake pedal is depressed, or stepped upon, the range of vehicle speed can be changed automatically from the D-range to some other preceding lower range regardless of the maintenance of the setting of the control means for the D-range.

However, in the conventional automatic transmission system of the above kind, whenever the brake pedal is stepped upon for lowering the vehicle speed, the above mentioned down shift of vehicle speed range is effected even in the case of running on a flat road in which the engine braking is not required at all, so that an uncomfortable feeling caused by the lowered speed is impressed to passengers each time of braking, and, as a result, the feel of the driving is impaired.

SUMMARY OF THE INVENTION

An object of the present invention is to remove the above mentioned troublesome matter caused in the conventional automatic transmission system.

Another object of the present invention is to provide an improved automatic transmission system in which, only in the case that, in such a state of running as the acceleration of a vehicle exceeds a previously established or predetermined amount, the driver releases the accelerator pedal and then steps on the brake pedal, that is, only in the case of down slope running in which the engine braking is actually required, the down shift of the vehicle speed range is effected automatically, so as to perform the function of an engine brake exactly.

It is a feature of the present invention for achieving the above mentioned object that an electronically or hydraulically controlled automatic transmission system comprises an idling detection means for detecting the release of the accelerator pedal, a brake action detecting means for detecting the stepping of the brake pedal and an acceleration discriminating means for detecting the acceleration which exceeds the predetermined amount thereof, and, only when the detection output signals can be derived simultaneously from all of these means, the down shift or vehicle speed range from the higher speed range to the other lower speed range is effected automatically, so as to attain the function of an engine brake, and further the detection output signal derived from the idling detection means can be delayed appropriately, so as to prevent the function of the engine brake in the case of ordinary running incorporated with frequent slight variations in acceleration, for instance, in the running on a gradual up and down slope.

The present invention will be described in more detail with reference to the following drawings hereinafter.

DETAILED DESCRIPTION OF THE PREFERRED EMBODIMENTS

Figure 1:
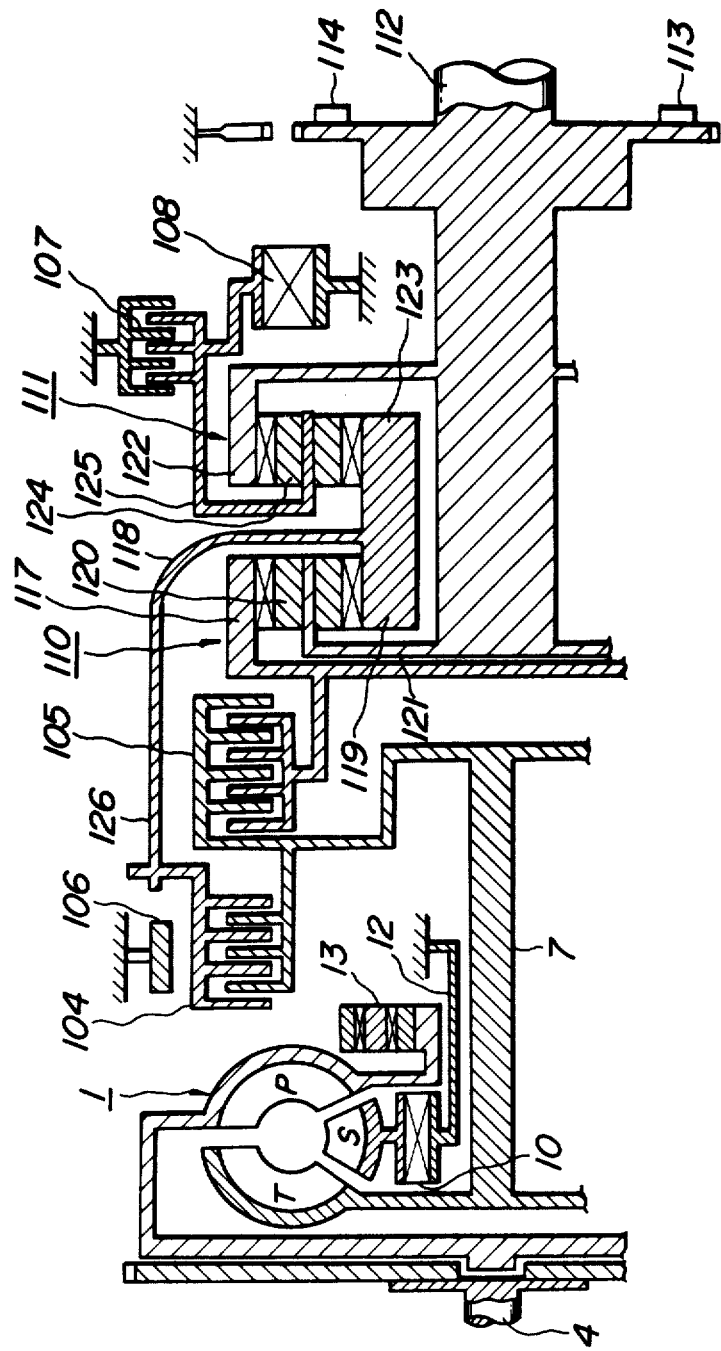
FIG. 1 is a cross-sectional view showing schematically an ordinary gear train of an automatic transmission system.

FIG. 1 shows schematically the internal construction of a power transmission mechanism of an automatic transmission system of the three forward speed and one reverse speed type. The mechanism comprises a crankshaft 4 driven by an engine, a torque converter 1, an input shaft 7, a front clutch 104, a rear clutch 105, a second brake 106, a low-reverse brake 107, a one-way clutch 108, a first planetary gear group 110, a second planetary gear group 111, an output shaft 112, a first governor valve 113, a second governor valve 114, and an oil pump 13. The torque converter 1 comprises a pump impeller P, a turbine runner T, and a stator S. The pump impeller P is driven by the crankshaft 4 to circulate the torque converter hydraulic oil contained therein and transfers the torque to the turbine runner T fixedly mounted on the input shaft 7. This torque is then transferred to a reduction gear train by the input shaft 7. The stator S is mounted on a fixed sleeve 12 via an intervention of a one-way clutch 10. This one-way clutch 10 has a construction to allow the stator S to rotate in a same direction with the rotation of the crankshaft 4 (hereinafter termed the forward direction), but it does not allow the stator to rotate in the opposite direction (hereinafter termed the opposite direction). The first planetary gear group 110 comprises an internal gear 117, a sun gear 119 fixed to a hollow transmission shaft 118, a planet pinion 120 formed of two or more small gears and meshed with both of the internal gear 117 and the sun gear 119 and further being rotatable about its own axis and at the same time to revolve round the sun gear 119, and a front planet carrier 121 fixed to the output shaft 112 and carrying the planet pinion 120. The second planetary gear group 111 comprises an internal gear 122 fixed to the output shaft 112, a sun gear 123 fixed to the hollow transmission shaft 118, a planet pinion 124 formed of two or more small gears and meshed with both of the internal gear 122 and the sun gear 123 respectively and further being able to rotate about its own axis and at the same time to revolve around the sun gear 123, and a rear planet carrier 125 carrying the planet pinion 124. The front clutch 104 couples the input shaft 7 driven by the turbine runner T with the hollow transmission shaft 118 rotating jointly with the two sun gears 119 and 123, while the rear clutch 105 functions to couple the input shaft 107 with the internal gear 117 of the first planetary gear group 110. By making the second brake 106 to tightly fasten the periphery of a drum 126 fixed on the hollow transmission shaft 118, the two sun gears 119 and 123 are fixed. The low-reverse brake 107 functions to fix the rear planet carrier 125 of the second planetary gear group 111. The one-way clutch 108 has a construction to allow the rear planet carrier 125 to rotate in the forward direction, but does not allow it to rotate in the opposite direction. The first governor valve 113 and the second governor valve 114 are fixedly mounted on the output shaft 112, so as to produce a governor pressure responsive to the speed of the vehicle.

Hereinafter, the operation of the power transmission mechanism with the select lever in the "D" position (automatic power transmission forward drive) will be explained.

At the beginning of this case, only the rear clutch 105 is coupled, which is an input clutch for the forward drive running. The power originated from the engine and transmitted through the torque converter 1 is transferred to the internal gear 117 of the first planetary gear group 110 via the input shaft 7 and the rear clutch 105. The internal gear 117 forces the planetary gear or planet pinion 120 to revolve in the forward direction. Therefore, the sun gear 119 rotates in the opposite direction and this causes the jointly rotating sun gear 123 of the second planetary gear group 111 to rotate in the opposite direction and hence the planet pinion 124 of the second planetary gear group 111 to revolve in the forward direction. The one-way clutch 108 prevents the sun gear 123 from rotating the rear planet carrier 125 in the opposite direction, so that it functions as a forward reaction brake. In this arrangement, the internal gear 122 of the second planetary gear group 111 rotates in the forward direction. Accordingly, the output shaft 112 jointly rotating with the internal gear 122 also rotates in the forward direction so as to produce the forward first speed range reduction ratio. If the vehicle speed increases from this condition and if the second brake 106 is actuated, the power delivered through the input shaft 7 and the rear clutch 105 is transferred to the internal gear 117 just the same as in the case of the first speed range. The second brake 106 holds the drum 126 stationary and prevents the rotation of the sun gear 119 so that it functions as a forward reaction brake. Accordingly, the planet pinion 120 rotates about its axis and revolves around the stationary sun gear 119. Therefore, the front planet carrier 121 and the output shaft 112 coupled thereto rotate forwardly at a reduced speed but higher than the first speed range, so as to produce a reduced ratio of the forward second speed range. If the vehicle speed increases further to release the second brake 106 and to couple the front clutch 104, the power transmitted to the input shaft 7 is on one hand transferred via the rear clutch 105 to the internal gear 117 and on the other hand transferred to the sun gear 119 via the front clutch 104. Accordingly, the internal gear 117 and the sun gear 119 are interlocked and, together with the front planet carrier 121 and the output shaft 112, rotate forwardly. All these members rotate at the same speed to produce the forward third speed range. In this case, the front clutch 104 and the rear clutch 105 correpond to an input clutch, and there is no reaction brake since an increase of the torque by the planetary gears is not effected.

Next, the operation of the power transmission mechanism with the select lever placed at the "R" position (reverse running) will be explained.

In this case, the front clutch 104 and the low-reverse brake 107 are coupled. The power delivered from the engine and transmitted through the torque converter 1 is conveyed to the sun gears 119 and 123 via the input shaft 7, the front clutch 104 and the drum 126. In this case, since the rear planet carrier 125 is fixed by the low-reverse brake 107, the internal gear 122 rotates oppositely at a reduced speed according to the forward rotation of the sun gear 119. The output shaft 112 jointly rotating with the internal gear 122 also rotates in the opposite direction and the reduced reverse running speed is delivered.

Figure 2:
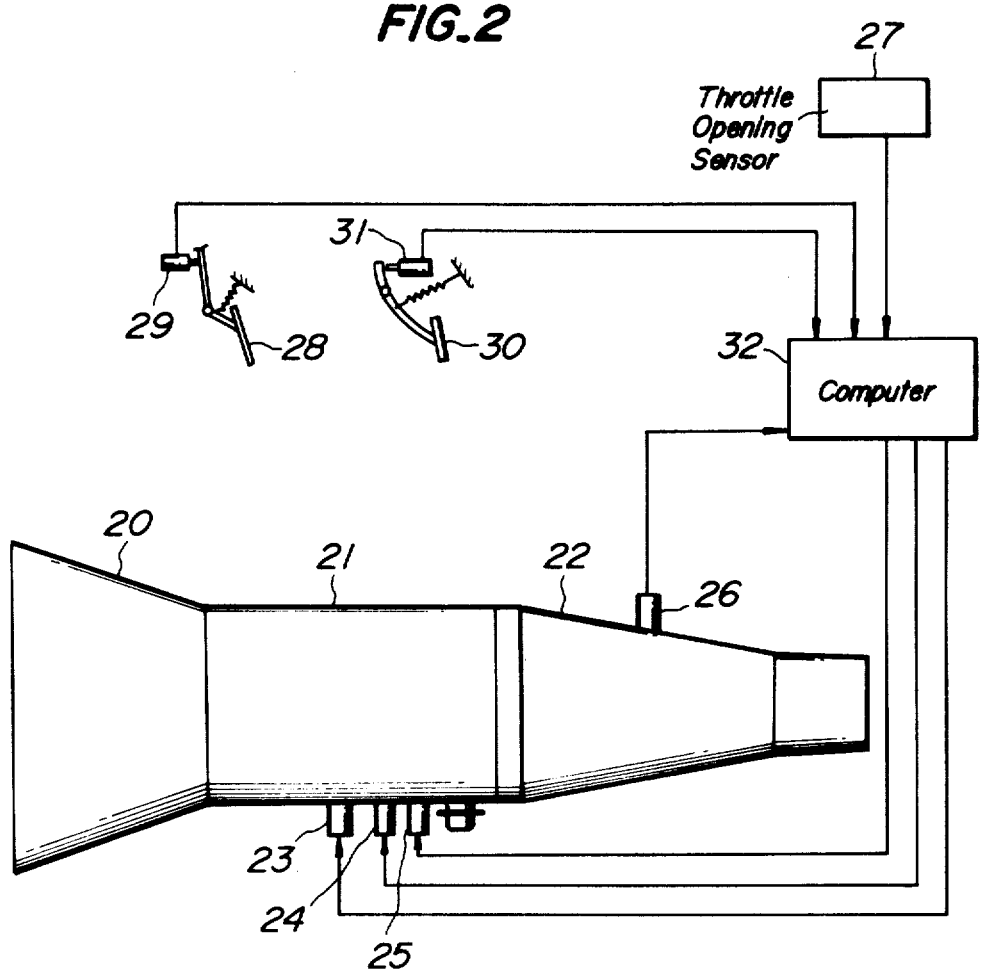
FIG. 2 is a schematic elevation showing a preferred embodiment of an automatic transmission system according to the present invention.

FIG. 2 shows schematically an embodiment of an electronic control system of the electronically controlled automatic transmission according to the present invention, which comprises a cutback solenoid 23, a 1-2 shift solenoid 24, a 2-3 shift solenoid 25, a vehicle speed sensor 26, a throttle opening sensor 27, an idle switch 9 which is used as an idling detection means for detecting the release of an accelerator pedal 28 incorporated therewith, so as to be made (or closed or actuated) when the accelerator pedal 28 is released, and a brake switch 31 which is used as a brake action detecting means for detecting the stepping of a brake pedal 30 incorporated therewith, so as to be made when the brake pedal 30 is stepped, those means being connected respectively with a computer 32 as shown in FIG. 2. Moreover, it is possible, if necessary, that the above mentioned control system further comprises comparators in which the detection output signals derived respectively from the idle switch 29, the brake switch 31 and the throttle opening sensor 27 are compared with predetermined values thereof respectively, and several kinds of switches which are operated respectively in response to the results of comparisons performed in those comparators, including a switch which is operated when the force for stepping the brake pedal 30 exceeds a predetermined amount thereof.

The computer 32 is used for disposing of various kinds of informations obtained from the above mentioned means and controlling the on-off of the 1-2 shift solenoid 24 and the 2-3 shift solenoid 25 with response to a result thereof as shown in Table 1, so that it is possible to operate the above mentioned various kinds of friction means selectively by a well known hydraulic control circuit having a desired form in response to the selected position of the manual valve in the automatic transmission system. Circle marks in Table 1 indicate the selectively operated friction means respectively.

tively through a first speed range switch 44 and a second speed range switch 45, which switches are made respectively only when the manual valve is settled selectively to a fixed first (I) speed range and a fixed second (II) speed range respectively. Accordingly, these shift decision circuits 37 and 38 are operated only at time durations when the first and second speed range switches 44 and 45 are made respectively, so as to apply high or low level signals to the NAND gates 42, 43

TABLE 1

| Selected position of manual valve | | 1-2 shift solenoid | 2-3 shift solenoid | Front clutch | Rear clutch | Low-reverse brake | Hand brake servo Operate | Hand brake servo Release |
|---|---|---|---|---|---|---|---|---|
| P-range | | OFF | OFF | | | | | |
| R-range | | OFF | OFF | o | | o | | o |
| N-range | | OFF | OFF | | | | | |
| D-range | first speed | ON | ON | | o | | | |
| | second speed | OFF | ON | | o | | o | |
| | third speed | OFF | OFF | o | o | | o | o |
| II-range | second speed | OFF | ON | | o | | o | |
| | third speed | OFF | OFF | o | o | | o | o |
| I-range | second speed | OFF | OFF | | o | | o | |
| | first speed | ON | OFF | | o | o | | |

Figure 3:
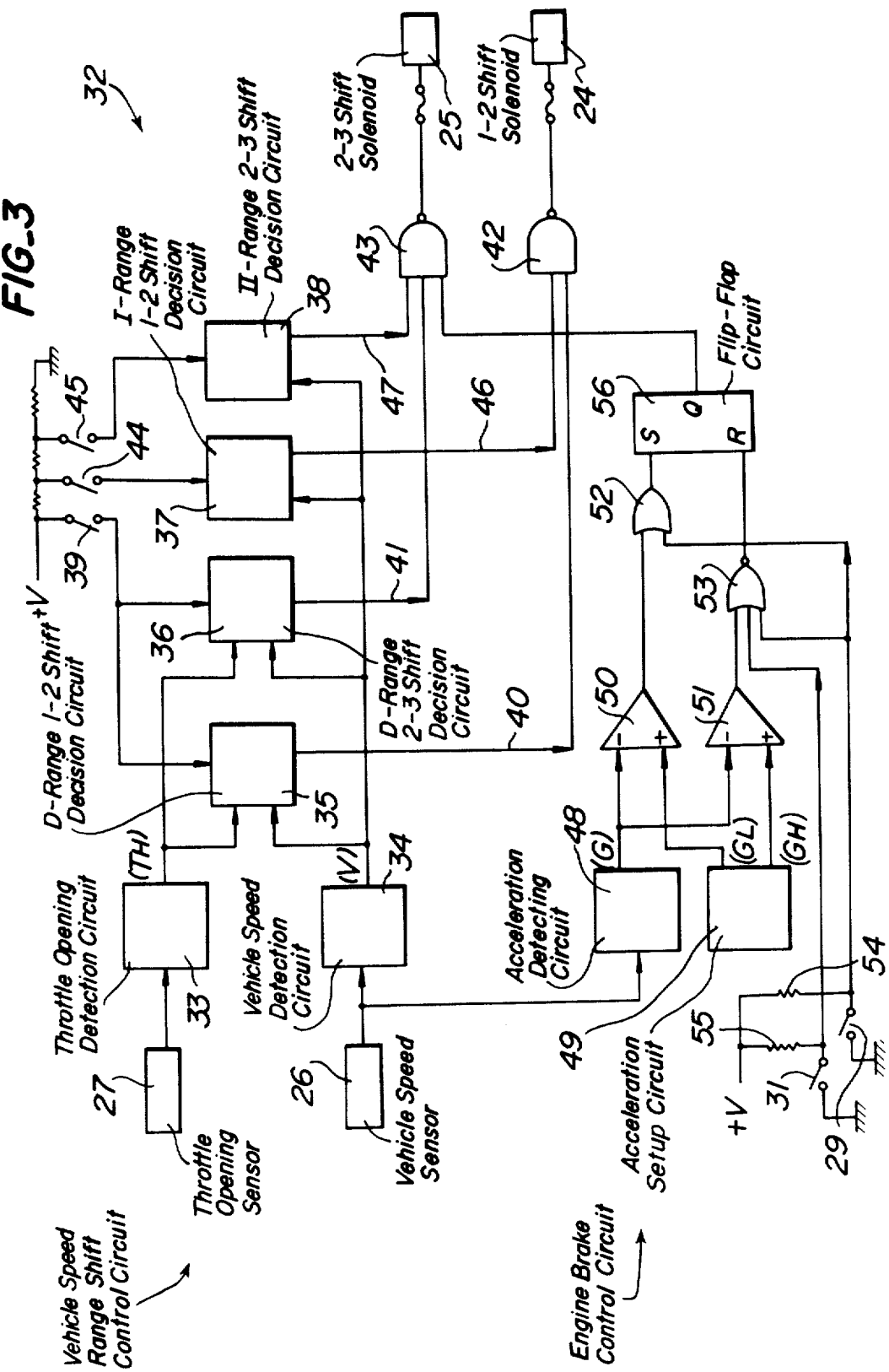
FIG. 3 is a block diagram showing a preferred embodiment of an electronic control section of the automatic transmission system according to the present invention.

FIG. 3 shows a preferred embodiment of the computer 32 employed in the automatic transmission system according to the present invention, so as to enable the above mentioned on-off control of the 1-2 shift solenoid 24 and the 2-3 shift solenoid 25. The computer 32 shown in FIG. 3 comprises a throttle opening detection circuit 33, which receives a detection output signal derived from the throttle opening sensor 27 and a vehicle speed direction circuit 34, which receives another detection output signal derived from the vehicle speed sensor 26, from which detection circuits 33 and 34 signals TH and V corresponding to the throttle opening and the vehicle speed respectively can be derived respectively as a result of disposing of the respectively received signals. The throttle opening signal TH is applied to a D-range 1-2 shift decision circuit 35 and a D-range 2-3 shift decision circuit 36, whilst the vehicle speed signal V is applied to the D-range 1-2 shift decision circuit 35, the D-range 2-3 shift circuit 37 and a II-range 2-3 shift decision circuit 38.

Both of the D-range shift decision circuits 35 and 36 are further supplied with a source voltage +V through a D-range switch 39 for a time duration when the manual valve is set selectively to the D-range, so that these D-range shift decision circuits 35, 36 are operated only in the above time duration, so as to apply a high or a low level signal to NAND gates 42 and 43 through circuits 40 and 41 respectively. That is, the respectively desired D-range 1-2 shift pattern and the D-range 2-3 shift pattern are memorized in these D-range shift decision circuits 35 and 36 respectively, so that, during the above mentioned time duration, a present state of running can be discriminated by comparing the received throttle opening signal TH and the received vehicle speed signal V with the memorized shift patterns respectively. Consequently, either the high (H) level signal or the low (L) level signal is applied to the NAND gates 42, 43 with response to the result of the above discriminations, as mentioned later.

On the other hand, the other shift decision circuits 37 and 38 are supplied with the source voltage +V respectively through circuits 46 and 47. That is, similarly as mentioned above, respective vehicle speeds corresponding to the respective upper limits of the allowable speed of revolution of the engine in the first and second speed ranges are memorized respectively in these shift decision circuits 37 and 38, so that at the above mentioned time durations, the vehicle speed can be discriminated by comparing the received vehicle speed signal V with the memorized respective vehicle speeds respectively whether the present vehicle speed forces the engine into a state of over-run or not. Consequently, either the high (H) level signal or the low (L) level signal is applied to the NAND gates 42, 43 in response to the result of the above discriminations, as mentioned later.

The outputs of those NAND gates 42 and 43 are respectively connected with the 1-2 shift solenoid 24 and the 2-3 shift solenoid 25, so that, these shift solenoids 24 and 25 are settled to a state of "on" respectively when the high level signal is derived from the NAND gate corresponding thereto, whilst these shift solenoids 24 and 25 are settled to a state of "off" respectively when the low level signal is derived from the NAND gate corresponding thereto.

According to the present invention, an engine brake control circuit is added to the above mentioned vehicle speed range shift control circuit as shown in the upper half of FIG. 3 as will be explained by referring to the lower half of FIG. 3 hereinafter.

The above engine brake control circuit comprises an acceleration discriminating means consisting of an acceleration detecting circuit 48 and an acceleration setup circuit 49 in addition to the idle switch 29 and the brake switch 31. The acceleration detecting circuit 48 receives the detection output signal derived from the vehicle speed sensor 26, so as to detect the increase or the decrease of the received signal intermittently at a predetermined interval. As a result thereof, the acceleration of the vehicle can be calculated from the strength of the detected increase or decrease of the received vehicle speeds during the above interval, so as to apply the calculated acceleration signal G to an input of each of the two comparators 50 and 51. On the other hand, the acceleration setup circuit 49 applies a signal $G_L$ relating to a lower setup acceleration and a signal $G_H$ relating to a higher setup acceleration to a respective another of the inputs of those two comparators 50 and 51 respectively.

The above lower setup acceleration signal $G_L$ corresponds to the upper limit of an acceleration range in which the engine brake is not required, whilst the above higher setup acceleration signal $G_H$ corresponds to the lower limit of another acceleration range in which the engine brake is required.

The comparator 50 applies a high or low level signal to an input of an OR gate 52 in response to whether the calculated acceleration signal G is lower or higher than the lower setup acceleration signal $G_L$ respectively, whilst the comparator 51 applies another high or low level signal to an input of a NOR gate 53 in response to whether the calculated acceleration signal G is lower or higher than the higher setup acceleration signal $G_H$ respectively.

Another input of the OR gate 52 is supplied with the source voltage +V corresponding to the above mentioned high level through a resistor 54 and further can be grounded through the idle switch 29, so as to be supplied with the ground potential corresponding to the above mentioned low level when the idle switch is made. On the other hand, one of the remaining two inputs of the NOR gate 53 is supplied with the source voltage +V in the same way as mentioned above, whilst the other one is supplied with the source voltage +V through a resistor 55 and further can be grounded through the brake switch 31, so as to be supplied with the ground potential corresponding to the low (L) level when the brake switch 31 is made, and contrarily to be supplied with the high (H) level when the brake switch 31 is released.

The output of the OR gate 52 is connected with a set input S of a flip-flop circuit 56 the output of the NOR gate 53 is connected with a reset input R of the flip-flop circuit 56, and further the output Q thereof is connected with a remaining input of the NAND gate 43. Thus, the flip-flop circuit 56 applies a high level signal to the NAND gate 43 when the high level signal derived from the OR gate 52 is applied to the set input S thereof, whilst the flip-flop circuit 56 applies a low level signal to the NAND gate 43 when the high level signal derived from the NOR gate 53 is applied to the reset input R thereof, which low level output signal is maintained until the high level signal derived from the OR gate 52 is applied to the set input S thereof.

The above mentioned electronic control circuit formed as shown in FIG. 3 according to the present invention is operated as follows.

When the manual valve is settled to the D-range by the driver for starting, the D-range switch 39 is made, so as to actuate the D-range shift decision circuits 35, 36. At the starting, the throttle opening signal TH and the vehicle speed signal V applied to those shift decision circuits 35, 36 present low levels respectively. Accordingly, it is discriminated by a comparison with the respective shift patterns memorized in those shift decision circuits 35, 36 so that the above applied low level signals TH and V are held in the first (I) speed range, and so that the low level signals are applied to the NAND gates 42 and 43 through the circuits 40 and 41 respectively. As a result thereof, these NAND gates 42 and 43 apply high level signals to the 1-2 shift solenoid 24 and the 2-3 shift solenoid 25 respectively, regardless of the signal levels applied to the remaining inputs of those NAND gates 42 and 43, so as to drive these solenoids 24 and 25 into the state of "on", and so that the automatic transmission system is settled into such a state as the first speed range is selected. As a result thereof, the driver can start the vehicle at the first vehicle speed by stepping on the accelerator pedal.

And then, when the vehicle is accelerated sufficiently, it is discriminated in the D-range 1-2 shift decision circuit 35 by the comparison with the 1-2 shift pattern memorized therein that at least either one of the throttle opening signal TH and the vehicle speed signal V is settled into the second speed range, so that the shift decision circuit 35 is switched into such a state as the high level signal derived therefrom is applied to the NAND gate 42 through the circuit 40. As a result thereof, the NAND gate 42 is switched in such a state as the low level signal derived therefrom is applied to the 1-2 shift solenoid 24, so as to release it. On the other hand, the NAND gate 43 is left as the low level signal derived from the D-range 2-3 shift decision circuit 36 is applied thereto, so that the high level signal derived therefrom is left as applied to the 2-3 shift solenoid 25, so as to hold it in a state of "on". As a result thereof, in the automatic transmission system controlled by the above mentioned electronic control circuit, the second speed range is selected with response to the above mentioned respective states of "off" and "on" of the solenoids 24 and 25, as shown in Table 1, so that the shift-up is effected from the first vehicle speed to the second vehicle speed.

As the acceleration of the vehicle is advanced further, it is discriminated in the D-range 2-3 shift decision circuit 36 also by a comparison with the 2-3 shift pattern memorized therein that at least one of the throttle opening signal TH and the vehicle speed signal V is settled into the third speed range, so that the shift decision circuit 36 is switched into such a state as the high level signal derived therefrom is applied to the NAND gate 43 through the circuit 41. Furthermore, the switch 45 is released in the running in the D-range, so that the high level signal derived from the II-range 2-3 shift decision circuit 38 is applied to the NAND gate 43 through the circuit 47. In addition thereto, during the further acceleration of the vehicle, the accelerator pedal 28 shown in FIG. 2 is left as stepped by the driver and the idle switch 29 is released so as to apply the high level signal to the OR gate 52. Accordingly, the high level signal derived from the OR gate 52 is applied to the set input S of the flip-flop circuit 56, regardless of the other input of the OR gate 52, so that the high level signal derived from the output Q of the flip-flop circuit 56 is applied to the NAND gate 43. As a result thereof, all of the inputs of the NAND gate 43 are applied with respective high level signals, so as to be switched in such a state as the low level signal derived therefrom is applied to the 2-3 shift solenoid 25, so as to release it.

On the other hand, the input signals of the NAND gate 42 are not varied even after the aforesaid shift-up from the first vehicle speed to the second vehicle speed, so that the 1-2 shift solenoid 24 is left as released thereafter. Consequently, in the automatic transmission system controlled by the above mentioned electronic control circuit, the third speed range is selected with response to the above mentioned respective states of "off" of both of the solenoids 24 and 25, as shown in Table 1, so that the shift-up is effected from the second vehicle speed to the third vehicle speed.

In case the manual valve in the automatic transmission system is settled into the fixed second speed range, the switch 45 is made, so as to actuate the II-range 2-3 shift decision circuit 38, and further the switches 39 and 44 are released, so as to release the other shift decision circuits 35, 36 and 37. As a result thereof, the respective high level signals derived from those other shift decision circuits 35, 36 and 37 are applied to the NAND gates 42 and 43 respectively through the circuits 40, 41 and 46. Moreover, this case in which the fixed second speed range is selected corresponds to such a case as the engine braking is utilized intentionally by the driver, so that the vehicle is kept slightly in a state of acceleration. Accordingly, the mutual relations between the calculated acceleration signal G and the setup acceleration signals $G_L$ and $G_H$ of $G<G_L$ and $G<G_H$ are discriminated respectively in the comparators 50 and 51, so that the high level signals derived therefrom are applied to the OR gate 52 and the NOR gate 53 respectively. Consequently, the high and low level signals derived respectively from these gates 52 and 53 are applied respectively to the set input S and the reset input R of the flip-flop circuit 56, so as to apply the high level signal derived from the output Q thereof to the NAND gate 43.

By the way, even if the vehicle is forced into a state of acceleration, this state of acceleration is caused only by the long stroke stepping of the accelerator pedal. Accordingly, in this state of acceleration, the high level signal caused by the released idle switch 29 is applied to the OR gate 52 and the NOR gate 53. As a result thereof, in any case, the high level signal derived from the output Q of the flip-flop circuit 56 is applied to the NAND gate 53.

In the above case in which a manual valve is settled into the fixed second speed range, the high level signal derived from the II-range 2-3 shift decision circuit 38 is applied to the NAND gate 43 through the circuit 47 in response to the vehicle speed signal G exceeding the setup vehicle speed memorized in the shift decision circuit 38. Consequently, all of the inputs of the NAND gates 42 and 43 are applied with the respective high level signals, so that the low level signals derived respectively from those NAND gates 42 and 43 are applied to the 1-2 shift solenoid 24 and the 2-3 shift solenoid 25 respectively, so as to release these solenoids 24, 25. As a result thereof, in the automatic transmission system controlled by the above mentioned electronic control circuit, regardless of the settlement of the manual valve into the fixed second speed range, the third speed range is selected automatically as shown in Table 1, so that the running over of the engine, which is caused by the settlement of the manual valve into the fixed second speed range in a state of high speed running, can be prevented.

However, in the same state as mentioned above, except for the actual vehicle speed being lower than the setup vehicle speed memorized in the shift decision circuit 38, the low level signal derived from the shift decision circuit 38 with response to the result of the comparison between the setup vehicle speed and the actual vehicle speed V is applied to the NAND gate 43 through the circuit 47, so as to energize the 2-3 shift solenoid 25 with the high level signal derived from the NAND gate 43 together with the 1-2 shift solenoid 24 released already as mentioned above, so that the manual valve in the automatic transmission system can be left as settled into the fixed second speed range, as shown in Table 1.

In case the manual valve in the automatic transmission system is settled into the fixed first speed range, the switch 44 is made, so as to activate the I-range 1-2 shift decision circuit 37, and further the switches 39 and 45 are released, so as to release the other shift decision circuits 35, 36 and 38. As a result thereof, the respective high level signals derived from those other shift decision circuits 35, 36 and 38 are applied to the NAND gates 42 and 43 respectively through the circuits 40, 41 and 47. Moreover, by the same reason as mentioned above regarding the settlement of the manual valve into the fixed second speed range, the high level signal derived from the output Q of the flip-flop circuit 56 is applied to the NAND gate 43. In this case, the high level signal derived from the shift decision circuit 37 with response to the actual vehicle speed V being higher than the setup vehicle speed memorized therein is applied to the NAND gate 42 through the circuit 46. Consequently, all of the inputs of the NAND gates 42, 43 are applied with the high level signals in this case, so that the low level signals derived respectively from the NAND gates 42 and 43 are applied respectively to the 1-2 shift solenoid 24 and the 2-3 shift solenoid 25, so as to release those solenoids 24, 25. As a result thereof, in the automatic transmission system controlled by the above mentioned electronic control circuit, regardless of the settlement of the manual valve into the fixed first speed range, the second speed range is selected automatically, so that the running over of the engine, which is caused by the settlement of the manual valve into the fixed first speed range in a state of high speed running, can be prevented.

However, in the same state as mentioned above, except for the actual vehicle speed being lower than the setup vehicle speed memorized in the shift decision circuit 37, the low level signal derived from the shift decision circuit 37 with response to the result of the comparison between the setup vehicle speed and the actual vehicle speed V is applied to the NAND gate 42 through the circuit 46, so as to energize the 1-2 shift solenoid 24 with the high level signal derived from the NAND gate 42 together with the 2-3 shift solenoid 25 released already as mentioned above, so that the manual valve in the automatic transmission system can be left as settled into the fixed first speed range, as shown in Table 1.

In the next place, the behaviour of the engine brake effected by the above mentioned electronic control circuit will be explained.

During the running at the third vehicle speed in such a state as the manual valve in the automatic transmission system is settled into the D-range, if the accelerator pedal 28 shown in FIG. 2 is released and the brake pedal 30 shown in FIG. 2 is stepped by the driver as in case when the vehicle approaches a down slope, the vehicle is impressed with an acceleration being worthy of the engine brake because of the down slope, and as a result thereof, the calculated acceleration signal G exceeds the higher setup acceleration signal $G_H$ as well as the lower setup acceleration signal $G_L$. Consequently, the low level signals derived respectively from the comparators 50 and 51 are applied to the OR gate 52 and the NOR gate 53 respectively. In this state of running in which the accelerator pedal 28 is released and the brake pedal 30 is stepped as mentioned above, both of the idle switch 29 and the brake switch 31 are made. Thus, all of the remaining inputs of the OR gate 52 and the NOR gate 53 are supplied also with the low level signals caused by those made switches 29, 31. Consequently, the low level signal derived from the OR gate 52 is applied to the set input S of the flip-flop circuit 56, whilst the high level signal derived from the NOR gate 53 is applied to the reset input R thereof, so as to apply the low level signal derived from the output Q thereof to the NAND gate 43. Therefore, the NAND gate 43 is made to apply the high level signal to the 2-3 shift solenoid 25, so as to energize this shift solenoid 25 which has been released during the running at the third vehicle speed as mentioned above. As a result thereof, the shift-down is effected from the third vehicle speed to the second vehicle speed in the automatic transmission system, so that the suitable behaviour of an engine brake can be realized in such a state as the manual valve is left as settled into the D-range.

Furthermore, the above mentioned suitable behaviour of the engine braking can be maintained so long as the idle switch 29 is not released by the stepping of the accelerator pedal 28 as well as the releasing of the brake pedal 30 by the driver, or, the mutual relation between the calculated acceleration signal G and the lower setup acceleration signal $G_L$ of $G<G_L$ is not caused by the mitigation of inclination of the down slope. That is, in the former state mentioned above, the high level signal caused by the release of the idle switch 29 is applied to the OR gate 52, whilst, in the latter state mentioned above, the high level signal derived from the comparator 50 is applied to the OR gate 52, so that, when either one of the above mentioned states is realized, the high level signal derived from the OR gate 52 is applied to the set input S of the flip-flop circuit 56. Accordingly, the flip-flop circuit 56 is switched to apply the high level signal derived from the output Q thereof to the NAND gate 43. Thus, the low level signal derived from the NAND gate 43, which has been applied with the high level signals derived from the shift decision circuits 36, 38 as mentioned above, is applied to the 2-3 shift solenoid 25, so as to release it. As a result thereof, the 2-3 shift solenoid 25 is left as released, so that the above mentioned behaviour of an engine brake can be rescinded automatically by the selection of the third speed range in the automatic transmission system.

As is apparent from the explanation above, in the automatic transmission system controlled by the electronic control circuit formed as mentioned above according to the present invention, it is possible to effect the engine brake by the automatic shift-down from the third speed range to the second speed range even in the state of running at the third vehicle speed in which state the manual valve is settled into the D-range, and further it is possible also to realize the above mentioned behaviour of an engine brake only when the engine brake is actually required; that is, only when the accelerator pedal is released as well as when the brake pedal is stepped by the driver and further the actual acceleration impressed on the vehicle because of the down slope running exceeds the setup amount thereof, so that it is possible to improve the drive feeling by preventing such an uncomfortable feeling of lowered speed as is frequently impressed to passengers, and which is caused by an unnecessary shift-down effected by the conventional control circuit. Moreover, once the above mentioned shift-down is effected by the electronic control circuit according to the present invention, the necessary behaviour of engine braking can be continued by maintaining the state of running at the second vehicle speed, so long as the acceleration impressed on the vehicle by the down slope running is not decreased under the amount worthy of the acceleration or the accelerator pedal is not stepped by the driver who wishes to raise the vehicle speed. Furthermore, it is possible also according to the present invention to effect the shift-up automatically, for instance, from the second speed range to the third speed range on account of the functions of the shift decision circuits 35, 36, so as to shift to the ordinary state of running, in succession to the release of the maintenance of the second speed range as soon as the above mentioned behaviour of engine brake is not further required.

Figure 4:
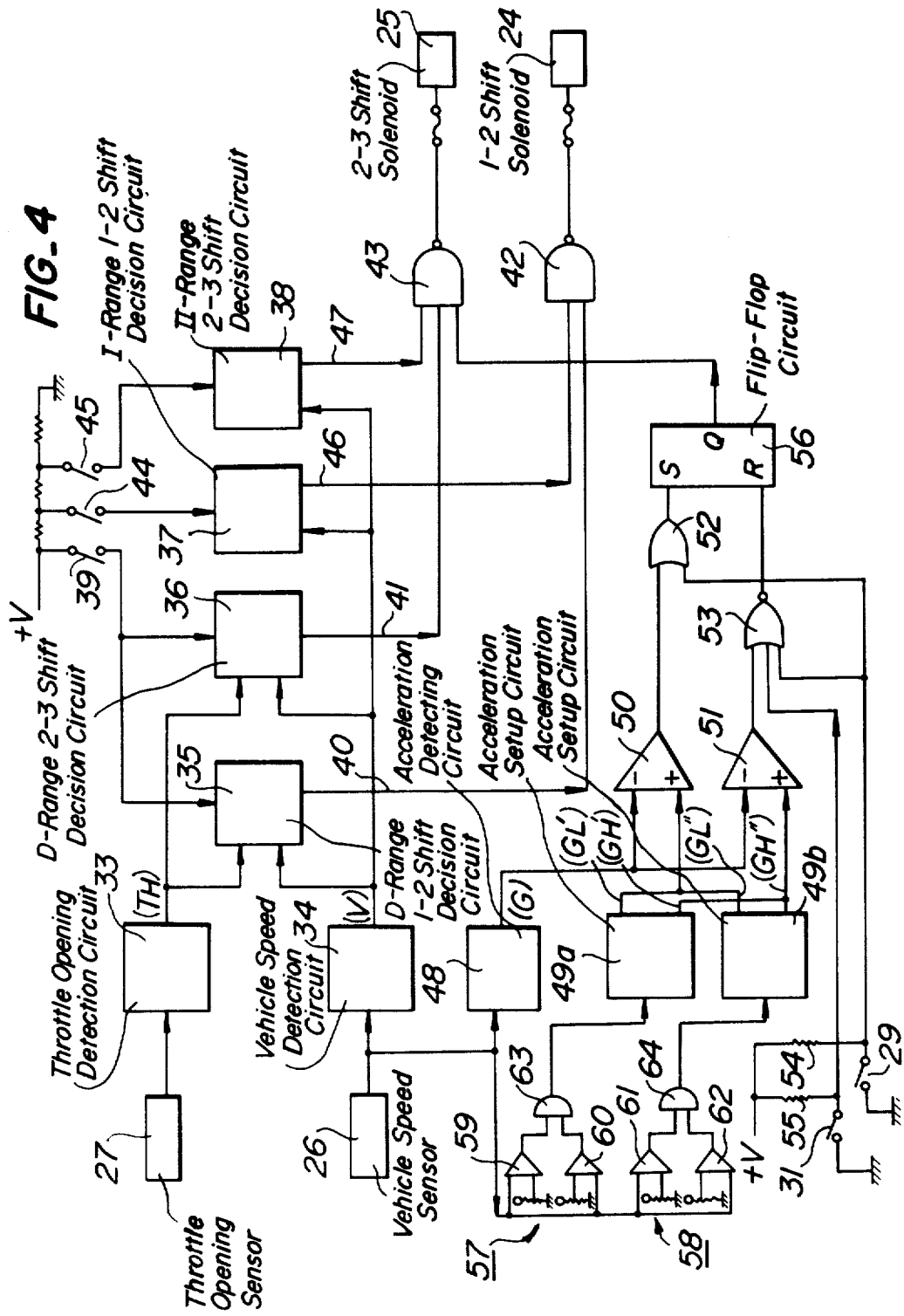
FIG. 4 is a block diagram showing a variation of the electronic control section shown in FIG. 3.

FIG. 4 shows an improved variation of the electric control circuit shown in FIG. 3 by which the function of engine braking can be realized more skilfully.

This improved electronic control circuit comprises two acceleration setup circuits 49a and 49b, and further two vehicle speed range discrimination circuits 57 and 58, so as to operate those acceleration setup circuits 49a, 49b selectively with the required vehicle speed range. These vehicle speed range discrimination circuits 57 and 58 comprise two pairs of comparators 59, 60 and 61, 62, which are supplied with the detection output signal derived from the vehicle speed sensor 26, and two AND gates 63 and 64 respectively. In case the lower speed range is required, a high level signal is derived from the comparator 59 in response to the actual vehicle speed exceeding the lower limit of the lower speed range and another high level signal is derived from the comparator 60 in response to the actual vehicle speed exceeding the upper limit thereof. These high level signals are applied to the AND gate 63, so that the high level signal derived from the vehicle speed range discrimination circuit 57 is applied to the acceleration setup circuit 49a, so as to operate it selectively. On the other hand, in case the higher speed is required, the comparators 61, 62 and the AND gate 64 are operated similarly as mentioned above, so that the high level derived from the vehicle speed range discrimination circuit 58 is applied to the acceleration setup circuit 49b, so as to operate it selectively. Consequently, the acceleration setup circuits 49a, 49b can be operated under the proper selection in response to the required one of the lower and higher speed ranges, so that the lower setup acceleration signals $G_L'$ and $G_L''$ and the higher setup acceleration signals $G_H'$ and $G_H''$ derived respectively from the acceleration setup circuits 49a and 49b can be settled into preferable amounts conforming to the vehicle speed ranges corresponding thereto respectively. When the acceleration setup circuit 49a is operated selectively in response to the required lower speed range, the lower and higher setup acceleration signals $G_L'$ and $G_H'$ are applied to the comparators 50 and 51 respectively, whilst, when the acceleration setup circuit 49b is operated selectively in response to the required higher speed range, the lower and higher setup acceleration signals $G_L''$ and $G_H''$ are applied to the comparators 50 and 51 respectively.

In the above mentioned electronic control circuit shown in FIG. 4 according to the present invention, it is possible that the desired behavior of engine braking can be effected regardless of the range of the actual vehicle speed. For example, it is possible to effect the engine braking by performing the exact shift-down in response to the detection of any slight acceleration caused by the down slope running. It is preferable that the higher setup acceleration signal $G_H''$ obtained in the higher speed range is smaller than the higher setup acceleration signal $G_H'$ obtained in the lower speed range.

It is possible also according to the present invention to obtain the most suitable performance of engine braking conforming to the present state of running by shifting the timing, at which the engine braking is effected, under the variation of numbers and performances of the vehicle speed range discrimination circuits and the acceleration setup circuits corresponding thereto.

As is apparent from the explanation above, it is possible also that the electronic control circuit shown in FIG. 4 is formed of digital circuit elements, and especially, the acceleration setup circuits 49a, 49b are replaced with a read only memory, that is, a so-called ROM in which the required setup acceleration signals are memorized, so as to be derived therefrom selectively with response to the required vehicle speed range, whenever necessary.

However, the above mentioned electronic control circuit provided with the improved function of engine braking according to the present invention possesses still such a defect as follows.

That is, in the electronic control circuit by which, when the actual vehicle speed exceeds the setup amount thereof after the accelerator pedal is released and the brake pedal is stepped, the engine brake can be effected automatically, in case the accelerator pedal is released and the brake pedal is stepped immediately after the abrupt acceleration is carried out in the flat road running, for instance, in case the vehicle approaches a down slope of a road having gradual and frequent up and down slopes, the acceleration of the vehicle tends to exceed the setup amount thereof during the braking action under the influence of the abrupt acceleration.

Therefore, the aforesaid three conditions required for attaining the function of engine braking according to the present invention, that is, the simultaneous detection of the release of the accelerator pedal, the stepping of the brake pedal and the acceleration exceeding the predetermined amount thereof are realized also, so as to effect the down shift from the highest speed range to the preceding speed range, regardless of the actual unnecessity of the engine brake because of the flat road running. Consequently, it is ascertained that it is impossible according to the above mentioned electronic control circuit to remove perfectly the aforesaid injurious drive feeling caused by the insufficient automatic engine brake.

However, regarding the aforesaid three conditions required for the realization of the function of engine braking according to the present invention, if the condition relating to the detection of the release of the accelerator pedal can be realized only when the release of the accelerator pedal is continued for a certain time duration, the above mentioned meaningless down shift in the flat road running can be prevented, so as to effect the sufficient automatic engine braking accompanied with no injurious drive feeling, since the stepping of the brake pedal is carried out during the above certain time duration, so as to force the vehicle to shift the speed thereof to the lower range.

Figure 5:
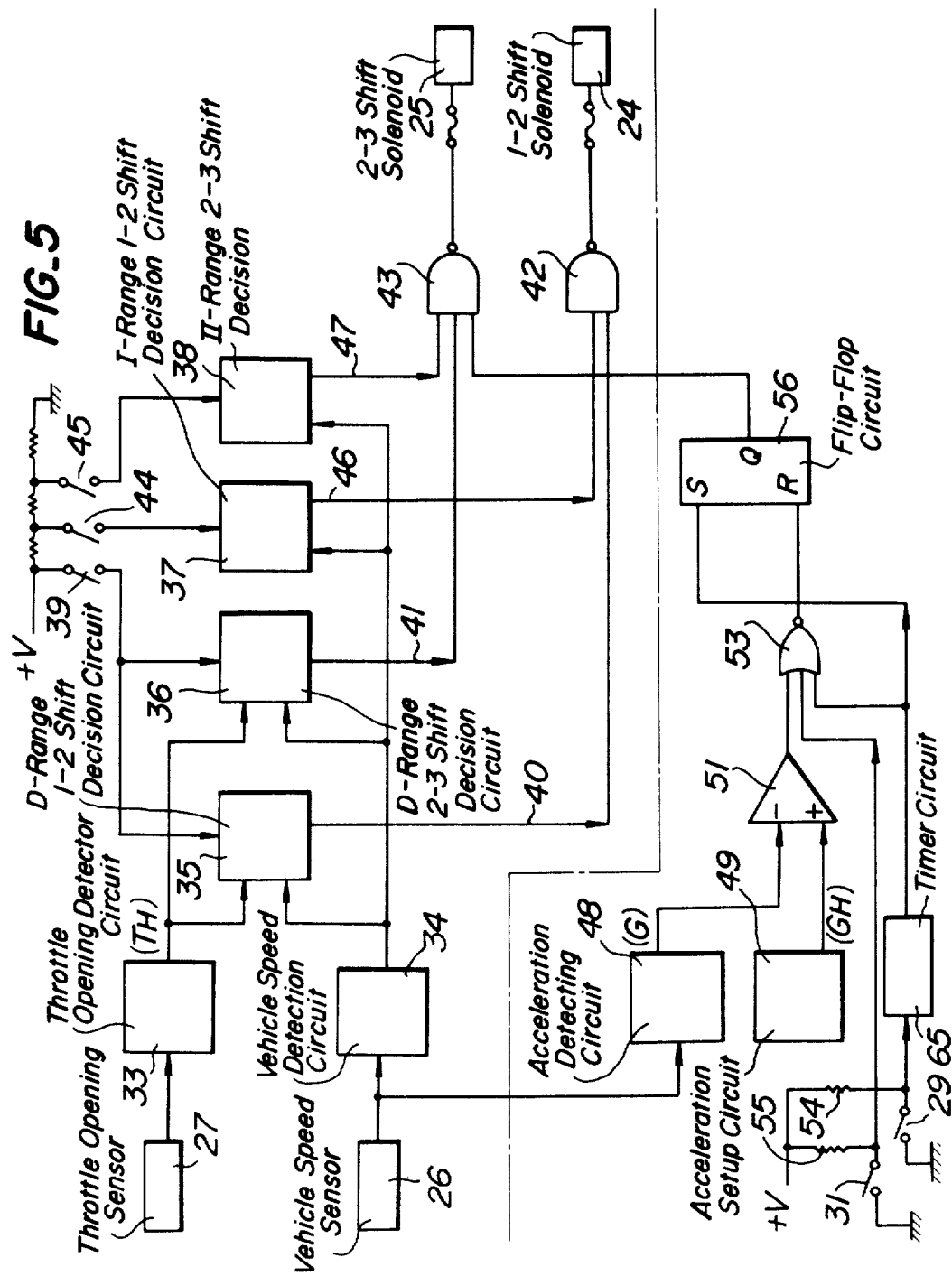
FIG. 5 is a block diagram showing another preferred embodiment of the electronic control section of the automatic transmission system according to the present invention.

The above mentioned further improvement of the function of engine braking according to the present invention can be attained by another electronic control circuit shown in FIG. 5.

In the electronic control circuit shown in FIG. 5, the vehicle speed range shift control circuit as shown in the upper half indicated by a chain line of FIG. 5 is just the same to the corresponding portion of FIG. 3, so that the explanation thereof will be not repeated.

An engine braking control circuit is added to above-mentioned vehicle speed range shift control circuit, as shown in the lower half indicated by the chain line of FIG. 5.

The above mentioned engine braking control circuit comprises an acceleration detecting circuit 48 and an acceleration setup circuit 49 in addition to the idle switch 29 and the brake switch 31. The acceleration detecting circuit 48 receives the detection output signal derived from the vehicle speed sensor 26, so as to detect the increase or the decrease of the received signal intermittently at a predetermined interval. As a result thereof, the acceleration of the vehicle can be calculated on the strength of the detected increase or decrease of the received vehicle speeds at the above interval, so as to apply the calculated acceleration signal G to one of inputs of a comparator 51. On the other hand, the acceleration setup circuit 49 applies a signal $G_H$ relating to a setup acceleration to another input of the comparator 51, which setup acceleration corresponds to the lower limit of an acceleration range in which the engine brake is required. The comparator 51 applies a high or low level signal to an input of a NOR gate 53 with response to whether the calculated acceleration signal G is lower or higher than the setup acceleration signal $G_H$ respectively.

One of the remaining two inputs of the NOR gate 53 is supplied with the source voltage +V through a timer circuit 65 and a resistor 54 successively, whilst the other one is supplied with the source voltage +V through a resistor 55. Moreover, the connection point between the timer circuit 65 and the resistor 54 can be grounded through the idle switch 29 and the input connected with the resistor 55 can be grounded through the brake switch 31. Consequently, the source voltage +V as a high level signal is supplied to the input corresponding thereto of the NOR gate 53 through the resistor 54 and the timer circuit 65, when the idle switch 29 is released, and contrarily the ground potential as a low level signal is applied to the above input, when the idle switch 29 is made, whilst the source voltage +V as a high level signal is applied to the input corresponding thereto of the NOR gate 53 through the resistor 55, when the brake switch 31 is released, and contrarily the ground potential as a low level signal is applied to the above input, when the brake switch 31 is made.

When the above mentioned low level signal as the accelerator pedal release signal should be applied to the corresponding input of the NOR gate 53 on account of the idle switch 29 made by the release of the accelerator pedal, the arrival of the above low level signal at the corresponding input of the NOR gate 53 is delayed by the timer circuit 65 until the above certain time duration is expired, whilst, when the above mentioned high level signal should be applied to the NOR gate 53 on account of the idle switch released by the stepping of the accelerator pedal, the above high level signal can arrive at the corresponding input of the NOR gate 53 with no time delay.

The timer circuit 65 is connected with a set input S of a flip-flop circuit 56 and with the above mentioned input of the NOR gate 53, an output of which is connected with a reset input R of the flip-flop circuit 56, an output Q of which is connected with one of the inputs of the NAND gate 43 in the aforesaid speed range shift control circuit. A high level signal is derived from the output Q of the flip-flop circuit 56 in response to the high level signal applied to the set input S thereof, and contrarily a low level signal is derived from the above Q output of the flip-flop circuit 56 in response to the high level signal applied to the reset input R thereof, and is further maintained until the other high level signal is applied to the set input S thereof.

The above mentioned electronic control circuit formed as shown in FIG. 5 according to the present invention is operated almost the same as the electronic control circuit shown in FIG. 3 except for the following.

As the acceleration of the vehicle is advanced further after the shift up has been effected from the first speed range to the second speed range, it is discriminated in the D-range 2-3 shift decision circuit 36 also by the comparison with the 2-3 shift pattern memorized therein at least either one of the throttle opening signal TH and the vehicle speed signal V is settled into the third speed range, so that the shift decision circuit 36 is switched into such a state as the high level signal derived therefrom is applied to the NAND gate 43 through the circuit 41. Furthermore, the switch 45 is released in the running in the D-range, so that the high level signal derived from the II-range 2-3 shift decision circuit 38 is applied to the NAND gate 43 through the circuit 47. In addition thereto, during the further acceleration of the vehicle, the accelerator pedal 28 shown in FIG. 2 is left as stopped by the driver and the idle switch 29 is released, so as to apply the high level signal to the set input S of the flip-flop circuit 56, so that the high level signal derived from the output Q of the flip-flop circuit 56 is applied to the NAND gate 43.

As a result thereof, all of the inputs of the NAND gate 43 are applied with respective high level signals, so as to be switched in such a state as the low level signal derived therefrom is applied to the 2-3 shift solenoid 25, so as to release it.

On the other hand, the input signals of the NAND gate 42 are not varied even after the aforesaid shift-up from the first vehicle speed to the second vehicle speed, so that the 1-2 shift solenoid 24 is left as released thereafter. Consequently, in the automatic transmission system controlled by the above mentioned electronic control circuit, the third speed range is selected in response to the above mentioned respective states of "off" of both for the solenoids 24 and 25, as shown in Table 1, so that the shift-up is effected from the solenoid vehicle speed to the third vehicle speed.

In case the manual valve in the automatic transmission system is settled into the fixed second speed range, the switch 45 is made, so as to activate the II-range 2-3 shift decision circuit 38, and further the switches 39 and 44 are released, so as to release the other shift decision circuits 35, 36 and 37. As a result thereof, the respective high level signals derived from those other shift decision circuits 35, 36 and 37 are applied to the NAND gates 42 and 43 respectively through the circuits 40, 41 and 46. Moreover, this case in which the fixed second speed range is selected corresponds to the case when the engine brake is utilized intentionally by the driver, so that the vehicle is kept slightly in a state of acceleration. Accordingly, the mutual relation between the calculated acceleration signal G and the setup acceleration signal $G_H$ of $G < G_H$ is determined in the comparator 51, so that the high level signal derived therefrom is applied to the NOR gate 53. Consequently, the low level signal derived from this NOR gate 53 is applied to the reset input R of the flip-flop circuit 56, so as to apply the high level signal derived from the output Q thereof to the NAND gate 43.

Even if the vehicle is forced into a state of acceleration, this state of acceleration is caused only by the long stroke stepping of the accelerator pedal. Accordingly, in this state of acceleration, the high level signal caused by the released idle switch 29 is applied to the NOR gate 53. As a result thereof, in any case, the high level signal derived from the output Q of the flip-flop circuit 56 is applied to the NAND gate 53.

In the above case in which the manual valve is settled into the fixed second speed range, the high level signal derived from the II-range 2-3 shift decision circuit 38 is applied to the NAND gate 43 through the circuit 47 in response to the vehicle speed signal G exceeding the setup vehicle speed memorized in the shift decision circuit 38.

Consequently, all of the inputs of NAND gates 42 and 43 are applied with the respective high level signals, so that the low level signals derived respectively from the NAND gates 42 and 43 are applied to the 1-2 shift solenoid 24 and the 2-3 shift solenoid 25 respectively, so as to release these solenoids 24, 25. As a result thereof, in the automatic transmission system controlled by the above mentioned electronic control circuit, regardless of the settlement of the manual valve into the fixed second speed range, the third speed range is selected automatically as shown in Table 1, so that the running over of the engine, which is caused by the settlement of the manual valve into the fixed second speed range, can be prevented.

In the next place, the behaviour of the engine brake effected by the above mentioned electronic control circuit will be explained.

During the running at the third vehicle speed in such a state as the manual valve in the automatic transmission system is settled into the D-range, if the accelerator pedal 28 shown in FIG. 2 is released and the brake pedal 30 shown in FIG. 2 is stepped by the driver in case the vehicle approaches a down slope, the vehicle is impressed with an acceleration worthy of the engine brake because of the down slope, and as a result thereof, the calculated acceleration signal G exceeds the higher setup acceleration signal $G_H$. Consequently, the low level signal derived from the comparator 51 is applied to the NOR gate 53. In this state of running in which the acceleration pedal 28 is released and the brake pedal 30 is stepped as mentioned above, both the idle switch 29 and the brake switch 31 are made.

Once the idle switch 29 is made, the timer circuit 65 is operated. During a time duration which is set up by the above operation of the timer circuit 65, the high level signal derived therefrom continues to be applied to the corresponding input of the NOR gate 53 and the set input S of the flip-flop circuit 56, so as to keep the 2-3 shift solenoid 25 as released, so that the third speed range is maintained as selected. However, after the above setup time duration expires, the low level signal derived from the timer circuit 65 is applied to the above-mentioned inputs. On the other hand, when the brake switch 31 is made, the last remaining input of the NOR gate 53 is applied with the low level signal caused thereby, so as to apply the high level signal to the reset input R of the flip-flop circuit 56. Consequently, the low level signal derived from the output Q of the flip-flop circuit 56 is applied to the NAND gate 43. Thus, the NAND gate 43 is made to apply the high level signal to the 2—3 shift solenoid 25, so as to energize this shift solenoid 25 which has been released during the running at the third vehicle speed as mentioned above. As a result thereof, the shift-down is effected from the third vehicle speed to the second vehicle speed in the automatic transmission system, so that the suitable behaviour of engine braking can be realized in such a state as the manual valve is left as settled into the D-range.

Furthermore, the above mentioned suitable behaviour of engine brake can be maintained so long as the idle switch is not released by the stepping of the accelerator pedal. That is, in the above state the high level signal caused by the released idle switch 29 is applied to the corresponding input of the NOR gate 53 and the set input S of the flip-flop circuit 56 through the timer circuit 56. However, the timer circuit 65 is not operated as mentioned above in this state, so that the above high level signal is applied to the above inputs at the same time as the idle switch 29 is released. Accordingly, the flip-flop circuit 56 is switched immediately to apply the high level signal derived from the output Q thereof to the NAND gate 43. So that, the low level signal derived from the NAND gate 43, which has been applied with the high level signals from the shift decision circuits 36, 38 as mentioned earlier, is applied to the 2-3 shift solenoid 25, so as to release it. As a result thereof, the 2-3 shift solenoid 25 is left as released, so that the above mentioned behaviour of engine braking can be rescinded automatically by the selection of the third speed range in the automatic transmission system.

For the above rescission of the behaviour of engine braking, the timer circuit 65 applies the above high level signal caused by the released idle switch 29 to the above inputs without such a time delay as mentioned above, so that it is possible to effect the shift-up to the third speed range at the same time as the accelerator pedal is stepped, so as to attain the smooth acceleration.

As is apparent from the explanation above, in the automatic transmission system controlled by the electronic control circuit formed as mentioned above by referring to FIG. 5, it is possible to effect the engine braking by the automatic shift-down from the third speed range to the second speed range even in the state of running at the third vehicle speed in which state the manual valve is settled into the D-range. Furthermore, it is possible also to delay the operation of the shift-down required for the engine brake by the time duration settled by the timer circuit 65. Accordingly, even if the actual acceleration of the vehicle exceeds the setup acceleration under the influence of the abrupt acceleration during the above operation of engine braking, which abrupt acceleration is caused, for instance, in case the accelerator pedal is released and the brake pedal is stepped immediately after the abrupt acceleration is performed in the running on the flat road, the unnecessary down-shift in the flat road running can be avoided, so as to prevent an impaired drive feeling. Moreover, once the above down-shift is performed, the second vehicle speed can be maintained, so as to effect the necessary engine brake sufficiently, so long as the accelerator pedal is stepped by the driver who wishes the increased vehicle speed, and further it is possible also that, as soon as the engine brake is not required on account of the stepping of the accelerator pedal, the automatic shift up can be effected by the shift decision circuit 35, 36 from the rescinded second speed range, for instance, to the third speed range, so as to shift the state of running to the ordinary automatic speed-controlled running.

Figure 6:
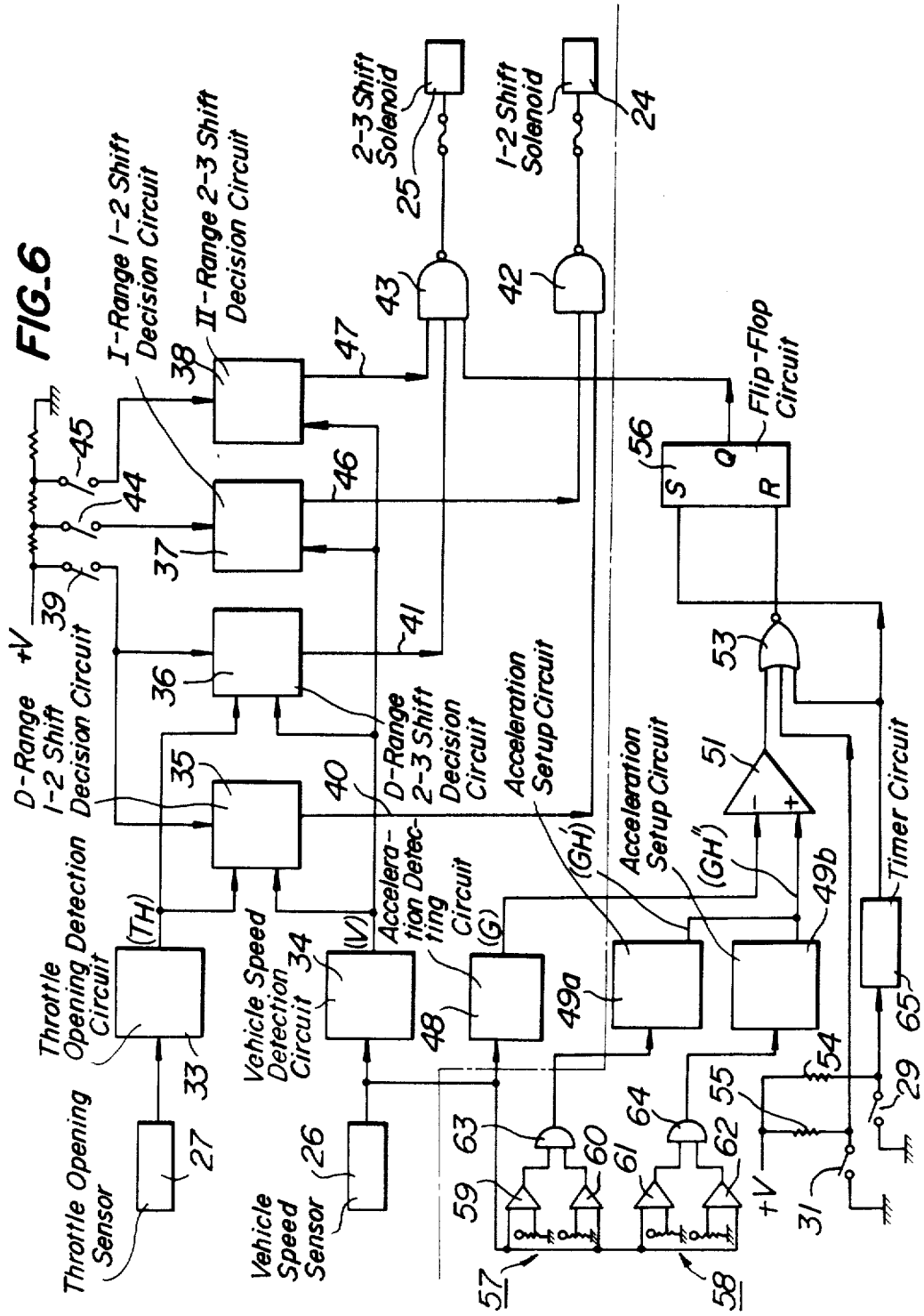
FIG. 6 is a block diagram showing a variation of the electronic control section shown in FIg. 5.

FIG. 6 shows an improved variation of the above mentioned electronic control circuit shown in FIG. 5 similarly as FIG. 4 shows the improved variation of the electronic control circuit shown in FIG. 3. This improved electronic control circuit shown in FIG. 6 comprises two acceleration setup circuits 49a and 49b and further two vehicle speed range discrimination circuits 57 and 58, these circuits 49a, 49b, 57 and 58 being operated similarly as in the electronic control circuit shown in FIG. 4. That is, those acceleration setup circuits 49a, 49b are operated selectively with response to the required vehicle speed range. In case the lower speed range is required, the high level signal derived from the vehicle speed range discrimination circuit 57 is applied to the acceleration setup circuit 49a, so as to operate it selectively, whilst in case the higher speed range is required the high level signal derived from the vehicle speed range discrimination circuit 58 is applied to the acceleration setup circuit 49b, so as to operate it selectively.

Consequently, the acceleration setup circuits 49a, 49b can be operated under the proper selection with response to the required speed range. When the acceleration setup circuit 49a is operated selectively with response to the required lower speed range, the higher setup acceleration signal $G_H'$ is applied to the comparator 51, whilst, when the acceleration setup circuit 49b is operated selectively, with response to the required higher speed range, the higher setup acceleration signal $G_H''$ is applied to the comparator 51.

In the above improved electronic control circuit shown in FIG. 6, it is possible that the desired behaviour of engine braking can be effected regardless of the range of the actual vehicle speed, similar to that shown in FIG. 5, except that different setup accelerations can be selected in response to the required speed range.

In the next place, still another preferred embodiment of the present invention, in which ranges of vehicle speed can be changed to each other under the hydraulic control.

Figure 7:
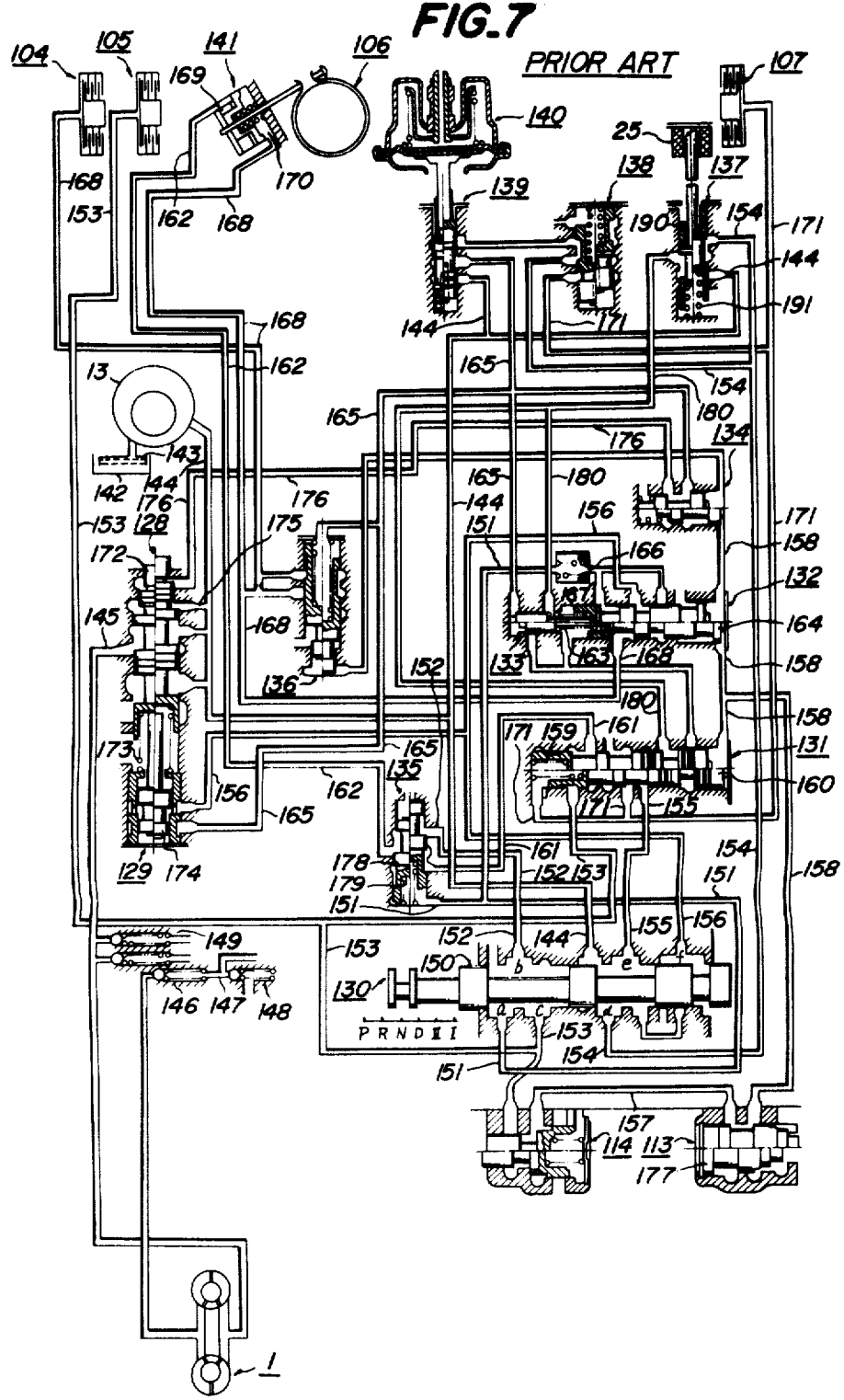
FIG. 7 is a schematic cross-sectional view showing an ordinary hydraulic control circuit of the automatic transmission system.

FIG. 7 shows a hydraulic control circuit for controlling hydraulically the switching of transmission lines in the power transmission mechanism. The system comprises an oil pump 13, a pressure regulator valve 128, a pressure booster valve 129, a torque converter 1, a manual valve 130, a first governor valve 113, a second governor valve 114, a 1-2 shift valve 131, a 2-3 shift valve 132, a throttle modulator valve 133, a pressure modifier valve 134, a second lock valve 135, a 2-3 timing valve 136, a solenoid downshift valve 137, a throttle back up valve 138, a vacuum throttle valve 139, a vacuum diaphragm 140, a front clutch 104, a rear clutch 105, a second brake 106, a band servo 141, a low-reverse brake 107, and the hydraulic pressure passage connecting those frictional elements. The oil pump 13 is driven by the engine through the crankshaft 4 and the pump impeller P of the torque converter 1 and presses out to circulate the hydraulic oil continuously to a line pressure circuit 144 during the operation of the engine after pumping up the oil from a reservoir 142 through a strainer 143 for removing the harmful dust.

The oil is adjusted to assume a predetermined pressure by the pressure regulator valve 128 and is sent to the torque converter 1 and the manual valve 130 as the hydraulic oil. The pressure regulator valve 128 comprises a spool 172 and a spring 173. The spool 172 is biased by the spring 173 and in addition to it the throttle pressure of a circuit 165 via a spool 174 of a pressure booster valve 129 and the line pressure of a circuit 156 are applied in a direction to counteract the line pressure from a circuit 144 being applied to upside of the spool 172 through an orifice 175 and also a pressure being applied likewisely from a circuit 176. The operational hydraulic pressure of the torque converter 1 is obtained by an operational hydraulic oil fed to a circuit 145 via a pressure regulator valve 128 and is kept at a pressure higher than a certain value by a pressure keeping valve 146 after fed through the torque converter 1. If the abovementioned certain pressure is exceeded, the pressure keeping valve 146 opens and the hydraulic oil is sent to a rear lubricating portion of the power transmission system. If this lubricating oil pressure is too high, a relief valve 148 opens to decrease the pressure. On the other hand, to the front lubricating portion of the power transmission system, the lubricating oil is supplied from the circuit 145 by opening a front lubricating valve 149. A manual valve 130 is provided which is a flow direction switching valve operated manually by a select lever (not shown). This manual valve 130 comprises a spool 150 coupled to the select lever via a linkage. By the respective selecting operation, the spool 150 is moved to switch the hydraulic pressure path of the line pressure circuit 144. The condition as indicated in FIG. 2 is that the select lever is set at the neutral position (N), where the line pressure circuit 144 is opened to a port d and a port e, respectively. The first governor valve 113 and the second governor valve 114 operate the 1-2 shift valve 131 and the 2-3 shift valve 132 by a governor pressure produced at the forward drive running so as to effect the automatic gear shifting function and also to control the line pressure. In case the manual valve 130 is either in the D, II or I position, the hydraulic pressure is fed from the line pressure circuit 144 via a port c of the manual valve 130 to the second governor valve 114. If the vehicle runs, the governor pressure adjusted in proportion to the vehicle speed by the second governor valve 114 is sent to a circuit 157 and introduced in the first governor valve 113. When the vehicle speed exceeds a certain value, the spool 177 of the first governor valve 113 moves to connect the circuit 157 with a circuit 158 and a governor pressure is sent to the circuit 158. This governor pressure fed through the circuit 158 acts on each of the end surfaces of the 1-2 shift valve 131, the 2-3 shift valve 132, and the pressure modifier valve 134, respectively, to balance with respective biases the force caused by the respective springs and a force caused by the hydraulic pressure pressing each of the valves towards the right as shown in the drawing. The 1-2 shift valve 131 and the second lock valve 135 are separately provided between the hydraulic oil circuit starting from the port c of the manual valve 130 and via the circuit 18, the circuit 161 and the circuit 11 and leading to a servo applying chamber 169 of a band servo 141 for fastening the second brake 106. Further there is provided with a circuit 152 leading from the port b of the manual valve 130 to the second lock valve 135.

Accordingly, if the select lever is set at the D position, the spool 150 of the manual valve 130 is moved so that the line pressure circuit 144 is supplied to the ports a, b and c, respectively. From the port a, the hydraulic pressure passes the circuit 151 and a part thereof acts at the bottom side of the second lock valve 135. This pressure pushes up the second lock valve 135 in order that the circuit 161 now conducting to the circuit 162 will not be interrupted by the spool 178, which is biassed upwardly by a spring 179 and being depressed downwardly by the hydraulic pressure applied through the port b. Another part of the hydraulic pressure coming from the port a reaches the 2-3 shift valve 132 via an orifice 166 and a circuit 167. Further from the port c, the pressure is applied through a circuit 153 to the second governor valve 114, the rear clutch 105 and the 1-2 shift valve 131, so that the automatic transmission assumes the forward first speed drive condition. In this condition, if the vehicle speed reaches a certain value, by the governor pressure acting on the circuit 158, the spool 160 of the 1-2 shift valve 131, which is pressed towards right by the spring 159, is now moved toward left so as to effect an automatic shift operation from the forward first speed range to the forward second speed range as mentioned later. By the above movement, the circuit 153 is connected to the circuit 161 and the hydraulic pressure is fed through the second lock valve 135 and the circuit 162 to the servo applying chamber 169 of the band servo 141 to fasten the second brake 106 and, as a result thereof together with the fastening of the rear clutch 105, the transmission system changes to the aforesaid condition of forward second speed range. When the vehicle speed further increases and reaches a certain predetermined speed, the governor pressure of the circuit 158 overcomes the spring force of the spring 163 so the spool 164 of the 2-3 shift valve 132 is pressed towards left and the circuit 167 is connected to the circuit 168. From the circuit 168, the hydraulic pressure is in one part delivered to the servo release chamber 170 of the band servo 141 so as to release the second brake 106. The other part of the hydraulic pressure is delivered to the front clutch 104 so as to couple it so that the transmission system becomes the aforesaid third speed condition together with the fastening of the rear clutch 105. When the select lever is set at the II position (forward second fixed speed), the spool 150 of the manual valve 130 is moved to couple the line pressure circuit 144 to the ports b, c and d. The hydraulic pressure is sent from the ports b and c to the same places as in the case of D position and the rear clutch 105 is coupled. On the other hand, since at the bottom side of the second lock valve 135 there is no hydraulic pressure in the case of this II position, and since the spool 178 has a wider land area at the bottom side compared with the land area of its upper side opened to the circuit 152 and being applied with the hydraulic pressure, the spool 178 of the second lock valve 135 is pressed down against the spring force of the spring 179. By this, the circuit 152 is connected to the circuit 162 and the hydraulic oil pressure reaches to the servo applying chamber 169 of the band servo 141 so that the second brake 106 is fastened and the transmission system now becomes a condition of the forward second speed range. The hydraulic oil pressure passes, from the port d, the circuit 154 and reaches to the solenoid downshift valve 137 and the throttle back up valve 138. The port a of the manual valve 130 is isolated from the line pressure circuit 144. Also as the hydraulic oil pressure in the circuit 151 is not applied to the 2-3 shift valve 132, the release of the second brake 106 and the coupling of the front clutch 104 are not effected. Thus the transmission system will not assume the condition of the forward third speed range. The second lock valve 135 has a function together with the manual valve 130 to fix the transmission system in a condition of the forward second speed range.

When the select lever is set at the I position (forward fixed first speed), the line pressure circuit 144 is coupled to the ports c, d and e. The hydraulic pressure from the ports c and d are delivered to the same locations as in the case of II position so the rear clutch 105 is coupled. From the port e, the hydraulic oil pressure passes through the circuit 155, the 1-2 shift valve 131 and the circuit 171 and reaches on one hand to the low-reverse brake 107 to fasten this brake functioning as a forward reaction brake to put the transmission system in a condition of forward first speed range, and on the other hand reaches to the left hand side of 1-2 shift valve 131 and presses the spool 160 towards right together with the spring 159 to fix the forward first speed condition.

In case the accelerator pedal is stepped enough to be touched on the stopper thereof by the driver who wishes to attain a strong accelerating force in the state of running in the D-range of vehicle speed, a kick-down switch (not shown) provided in the midst of the accelerator link detects the above full stepping of the accelerator pedal, so as to be made, whereby the downshift solenoid 25' provided in combination with the solenoid downshift valve 137 is energized. Thus, a spool 190 of the solenoid downshift valve 137 is pushed from the upper position shown in FIG. 7 at which the spool 190 has been locked by a spring 191. As a result thereof, a kickdown circuit which has been connected with a circuit 154 is switched to be connected with the line pressure circuit 144, so that the line pressure is applied to the 1-2 shift valve 131 and the 2-3 shift valve 132, so as to content with the governor pressure. In case the running is carried out at the third vehicle speed at this time, the spool 164 of the 2-3 shift valve 132 is pushed forcibly by the above governor pressure from the left end position toward the right end position in FIG. 7, so that the forcible shift-down is effected within a certain limited range of vehicle speed from the third speed range to the second speed range, so as to attain the sufficient accelerating force. However, in case the above kickdown is carried out in the running at the second vehicle speed, the vehicle speed is lowered by the heavy load, and accordingly the governor pressure is lowered also, so that the spool 160 of the 1-2 shift valve 131 is pushed also from the left end position toward the right end position by the line pressure impressed through the circuit 180 against the governor pressure.

Consequently, the forcible down-shift is carried out in this case from the second vehicle speed to the first vehicle speed, so as to attain a further powerful accelerating force corresponding to the heavy load.

The hydraulically controlled automatic transmission system explained above by referring to FIGS. 1 and 7 is provided with such an engine brake control circuit as mentioned earlier regarding the electronically controlled automatic transmission system according to the present invention.

Figure 8:
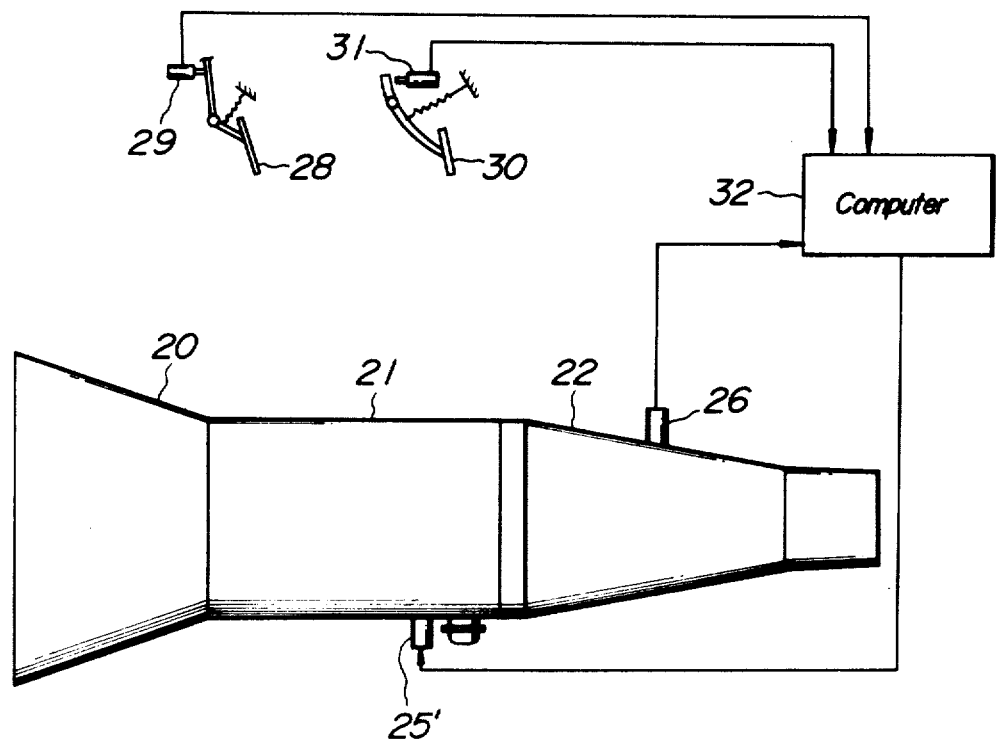
FIG. 8 is a schematic elevation showing another preferred embodiment of the automatic transmission system incorporated according to the present invention with the hydraulic control circuit shown in FIG. 7.

FIG. 8 shows schematically a preferred embodiment of the above engine brake control circuit used for the hydraulically controlled system. In FIG. 8, reference numeral 20 denotes a converter cover, numeral 21 refers to a transmission case, and numeral 22 refers to a rear extension provided behind the transmission case 21.

The torque converter 1 is accommodated in the converter cover 20, and other power transmitting elements including the front clutch 104, the rear clutch 105, the second brake 106 and low-reverse brake 107 are accommodated in the transmission case 21 and the rear extension 22, and further the hydraulic control circuit shown in FIG. 7 together with the above mentioned various kinds of valves is mounted in a package in the lower part of the transmission case 21. The aforesaid downshift solenoid 25' is also mounted in the lower part of the transmission case 21. The engine brake control circuit according to the present invention as shown in FIG. 8 further comprises the vehicle speed sensor 26 mounted on the rear extension 22, the idle switch 29 used as an idling detection means which is connected with the accelerator pedal 28 so as to be made when the accelerator pedal 28 is released, and the brake switch 31 used as a brake operation detecting means which is connected with the brake pedal 30 so as to be made when the brake pedal 30 is stepped, and in addition thereto a computer 32 which receives respective signals derived therefrom.

The computer 32 applies the output signal thereof to the downshift solenoid 25', so as to control the "on" and "off" of the solenoid 25' separately from the control effected by the aforesaid kick-down signal.

Figure 9:
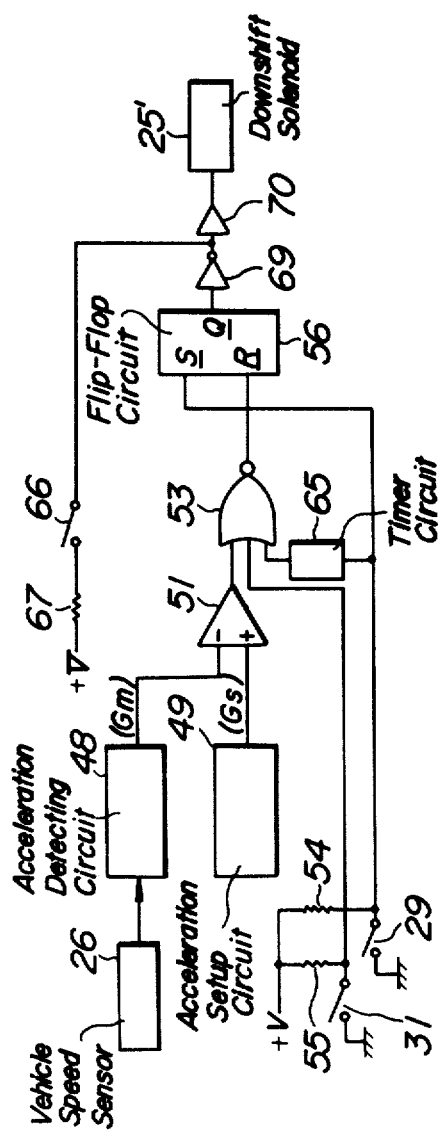
FIG. 9 is a block diagram showing still another preferred embodiment of the electronic control section used according to the present invention for controlling the hydraulic control circuit shown in FIG. 7.

FIG. 9 shows an example of the detailed configuration of the above mentioned computer 32.

This figured configuration of the computer 32 comprises an acceleration discriminating means consisting of the acceleration detecting circuit 48 and the acceleration setup circuit 49. The acceleration detecting circuit 48 is supplied with a vehicle speed signal derived from the vehicle speed sensor 26, so as to detect the increase or the decrease of the applied signal intermittently at a certain predetermined interval. As a result thereof, the acceleration of the vehicle can be calculated on the strength of the detected increase or decrease of the applied vehicle speeds at the above interval, so as to apply the calculated acceleration signal $G_m$ to a minus input of the comparator 51. On the other hand, the acceleration setup circuit 49 applies a signal $G_s$ relating to a setup acceleration to a plus input of the comparator 51. This setup acceleration signal $G_s$ corresponds to the lower limit of an acceleration range in which the engine brake is required.

The comparator 51 applies a high or low level signal to an input of the NOR gate 53 with response to whether the calculated acceleration signal $G_m$ is lower or higher than the setup acceleration signal $G_s$.

One of the remaining two inputs of the NOR gate 53 is connected with the source voltage +V through the timer circuit 65 and the resistor 54 successively, whilst the other remaining input of the NOR gate 53 is connected with the source voltage +V through the resistor 55. Moreover, the connection point between the timer circuit 65 and the resistor 54 can be grounded through the idle switch 29, so as to be supplied with the source voltage +V as a high level signal through the timer circuit 65 in an ordinary state in which the idle switch is released, and further the above connection point is connected with the set input S of the flip-flop circuit 56, whilst the input connected with the resistor 55 can be grounded through the brake switch 31, so as to be supplied with the source voltage +V as a high level signal in an ordinary state in which the brake switch 31 is released. Consequently, when the idle switch 29 is released, the source voltage +V as the high level signal is applied to the set input S of the flip-flop circuit 56 through the resistor 54 and to the corresponding input of the NOR gate 53 through the timer circuit 65, whilst, when the idle switch 29 is made, the ground potential as the low level signal is applied to those inputs. On the other hand, when the brake switch 31 is released, the source voltage +V as the high level signal is applied to the corresponding input of the NOR gate 53 through the resistor 55, whilst, when the brake switch 31 is made, the ground potential as the low level signal is applied to the above input.

When the low level signal caused by the made idle switch 29 should be applied to the corresponding input of the NOR gate 53 as mentioned above, the arrival of the above low level signal at the corresponding input is delayed by the timer circuit 65, whilst the high level signal caused by the released idle switch 29 can arrive at the corresponding input of the NOR gate 53 without such a time delay as mentioned above.

The output of the NOR gate 53 is connected with the reset input R of the flip-flop circuit 56, and further the output Q thereof is connected with an input of a NOT gate 69. The high or low level signal is derived from the output Q of the flip-flop circuit 56 with response to whether the high level signal is applied to the set input S thereof or to the reset input R, and further those high and low level signals can be held until the succeeding high level signal is applied to the set input S of the flip-flop circuit 56.

The output of the NOT gate 69 is connected with the aforesaid downshift solenoid 25' through an amplifier 70 and further with the aforesaid downshift solenoid 25' through a manual switch 66 and a resistor 67. The manual switch 66 is mounted near the driver seat, for instance, on the steering column or on the instrument panel, so as to facilitate the driver's manual control of the make and break thereof as occasion demands to satisfy the requisitions mentioned later.

In the automatic transmission system provided with the above mentioned engine brake control circuit according to the present invention, the operation of engine brake can be carried out automatically in such a way as explained hereinafter even in the state of running in the D-range.

During the running in the above mentioned state, if the accelerator pedal 28 is released and the brake pedal 31 is stepped by the driver in case the vehicle approaches a down slope, the vehicle is impressed with an acceleration being worthy of the engine brake because of the down slope, and as a result thereof, the calculated acceleration signal $G_m$ exceeds the setup acceleration signal $G_s$. Consequently, the low level signal derived from the comparator 51 is applied to the NOR gate 53. In this state of running in which the accelerator pedal 28 is released and the brake pedal 31 is stepped as mentioned above, both of the idle switch 29 and the brake switch 31 are made, so that all of the remaining inputs of the NOR gate 53 are applied also the low level signals by those made switches 29, 31. However, the low level signal caused by the idle switch 29 is applied to the corresponding input of the NOR gate 53 only after the time duration set up by the timer circuit 65 expires, and further applied to the set input S of the flip-flop circuit 56 also. Consequently, after the above setup time duration expires, all of the inputs of the NOR gate 53 are applied with low level signals respectively, so as to apply the high level signal to the reset input R of the flip-flop circuit 56. Accordingly, the low level signal derived from the output Q of the flip-flop circuit 56 is applied to the NOT gate 67, and then the high level signal derived therefrom can energized the downshift solenoid 25' after amplified by the amplifier 70. The energized downshift solenoid 25' operates the solenoid downshift valve 137 as mentioned above, so as to effect the forcible shift down from the third vehicle speed to the second vehicle speed during the running at the third vehicle speed in the D-range. Thus, the necessary behaviour of engine braking can be attained similarly as mentioned earlier by referring to FIG. 5, and further can be maintained and then can be rescinded so as to return to the ordinary state of running in the D-range, similarly also as mentioned earlier by referring to FIG. 5.

Furthermore, in case the driver feels it necessary to effect the engine brake separately from the above mentioned automatic engine brake, he can make the manual switch 66 so as to attain the above separative engine brake, whereby the source voltage +V as the high level signal is applied to the downshift solenoid 25' through the resistor 67, the switch 66 and the amplifier 70 for amplifying it. As a result thereof, the downshift solenoid 25' can be energized for the engine brake separately from the above-mentioned automatic engine brake.

Figure 10:
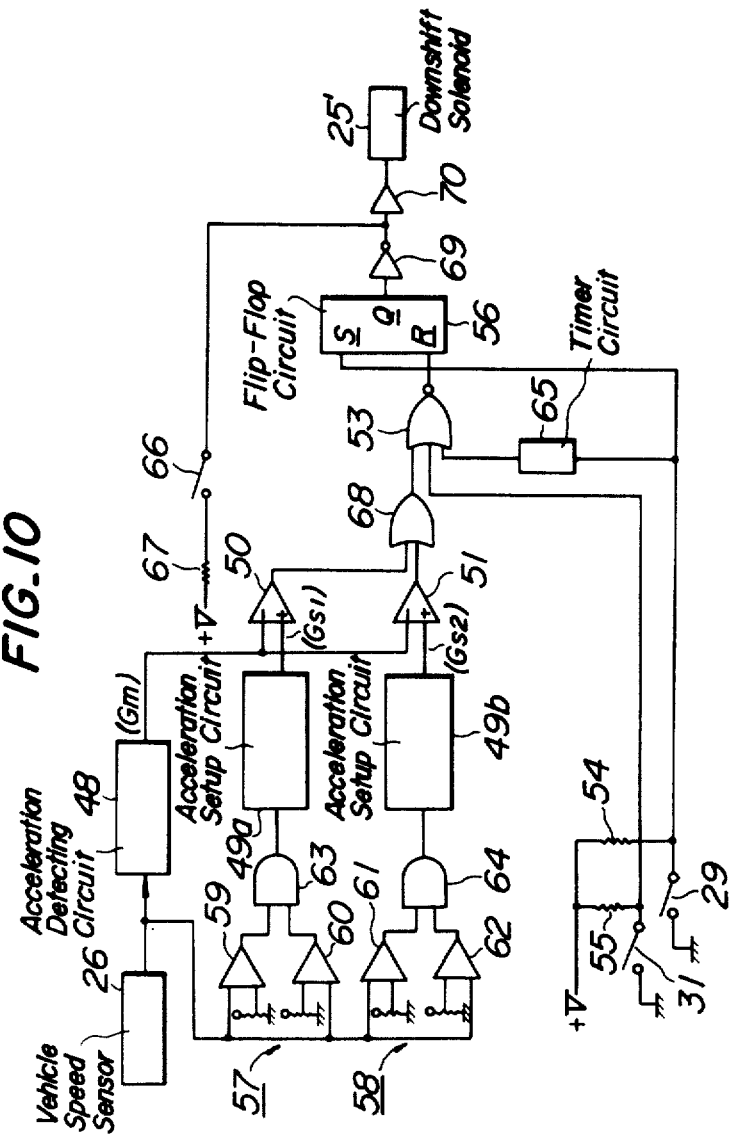
FIG. 10 is a block diagram showing a variation of the electronic control section shown in FIG. 8.

FIG. 10 shows a variation of the electric control circuit shown in FIG. 9, which variation comprises two acceleration setup circuit 49a and 49b and further two vehicle speed range discrimination circuits 57 and 58 just in the same manner as in the variations shown in FIGS. 4 and 6 in relation to the electronic control circuits shown in FIGS. 3 and 5 respectively. Accordingly, those circuits 49a, 49b and 57, 58 are operated just in the same way as mentioned earlier by referring to FIGS. 4 and 6.

Particularly speaking, when the acceleration setup circuit 49a is operated at the lower vehicle speed, the setup acceleration signal $G_{s1}$ derived therefrom is applied to the plus input of the comparator 50, whilst, when the acceleration setup circuit 49b is operated at the higher vehicle speed, the setup acceleration signal $G_{s2}$ derived therefrom is applied to the plus input of the comparator 51.

On the other hand, both of the minus inputs of those comparators 50 and 51 are applied with the calculated acceleration signal $G_m$ derived from the acceleration detecting circuit 48. Accordingly, in case $G_m \geq G_{s1}$ and $G_m \geq G_{s2}$, the low level signals derived from those comparators 50, 51 are applied to respectively corresponding inputs of the OR gate 68, whilst in case $G_m < G_{s1}$ and $G_m < G_{s2}$, the high level signals derived from those comparators 50, 51 are applied to respectively corresponding inputs of the OR gate 68. As a result thereof, when at least one of the inputs of the OR gate 68 is applied with the low level signal caused with response to the detection of $G_m \geq G_{s1}$ or $G_m \geq G_{s2}$, the low level signal derived therefrom is applied to the corresponding input of the NOR gate 53, so that the same operation as mentioned above by referring to FIG. 9 is carried out thereafter.

As is apparent from the above explanation it is possible according to the present invention to realize the automatic transmission system provided with the desired necessary function of engine brake which can be effected regardless of the range of the actual vehicle speed and the setting of the manual control.

What is claimed is:

1. An automatic transmission system, wherein a plurality of vehicle speed ranges are set up selectively by controlling a plurality of shift solenoids for shifting mutually the vehicle speed ranges, comprising:
- an idling detection means for detecting the release of an accelerator pedal,
- a brake action detecting means for detecting the stepping of a brake pedal,
- an acceleration discriminating means for detecting the acceleration which exceeds a predetermined amount thereof, and
- a control means for controlling said plurality of shift solenoids only when detection output signals are derived from all of said idling detection means, said brake action detecting means and said acceleration discriminating means, so as to effect automatically the down shift of the vehicle speed range for attaining the function of engine braking.

2. An automatic transmission system as claimed in claim 1, wherein said acceleration discriminating means can detect the excess of the vehicle acceleration over a higher predetermined amount thereof and the shortage of the vehicle acceleration below a lower predetermined amount thereof; and
- said control means controls said plurality of shift solenoids when said detection output signals are derived from said idling detection means and said brake action detecting means and said detection output signal for indicating said excess of the vehicle acceleration is derived from said acceleration discriminating means, so as to effect automatically the down shift of the vehicle speed range for attaining the function of engine braking,
- which function of engine braking is rescinded in response to said detection output signal for indicating said shortage of the vehicle acceleration.

3. An automatic transmission system as claimed in claim 1, wherein said acceleration discriminating means is formed so as to enable the variation of said predetermined amount in response to the vehicle speed.

4. An automatic transmission system as claimed in claim 1, further comprising:
- a timer circuit for delaying said detection output signal derived from said idling detection means by a predetermined time duration;
- wherein said control means controls said plurality of shift solenoids only when said output signals are derived from all of said timer circuit, said brake action detecting means and said acceleration discriminating means, so as to effect automatically the down shift of the vehicle speed range for attaining the function of engine braking.

5. An automatic transmission system as claimed in claim 1, wherein said plurality of vehicle speed ranges are set up selectively by hydraulically controlling a plurality of valves for driving said plurality of shift solenoids respectively, further comprising:
- at least one operation means incorporating with at least one of said plurality of valves for operating electronically said at least one of said plurality of valves independently;
- wherein said operation means operates electronically said at least one of said plurality of valves only when said detection output signals are derived from all of said idling detection means, said brake action detecting means and said acceleration discriminating means, so as to effect automatically the down shift of the vehicle speed range for attaining the function of engine braking.

6. An automatic transmission system as claimed in claim 5, wherein said acceleration discriminating means compares the vehicle acceleration with the setup acceleration which is varied in response to the vehicle speed.

7. An automatic transmission system as claimed in claim 5, further comprising:
- a timer circuit for delaying said detection output signal derived from said idling detection means by a predetermined time duration;
- wherein said control means controls said plurality of shift solenoids only when said output signals are derived from all of said timer circuit, said brake action detecting means and said acceleration discriminating means, so as to effect automatically the down shift of the vehicle speed range for attaining the function of engine braking.

* * * * *